US010953501B2

(12) United States Patent
Cabello et al.

(10) Patent No.: US 10,953,501 B2
(45) Date of Patent: Mar. 23, 2021

(54) METHOD OF REMOVING BEARING COMPARTMENT

(71) Applicant: UNITED TECHNOLOGIES CORPORATION, Farmington, CT (US)

(72) Inventors: Brian Cabello, Windsor, CT (US); Brittany Ann Booth, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 201 days.

(21) Appl. No.: 16/045,376

(22) Filed: Jul. 25, 2018

(65) Prior Publication Data

US 2020/0030924 A1    Jan. 30, 2020

(51) Int. Cl.
*B23P 19/04*   (2006.01)
*F01D 25/16*   (2006.01)
*F01D 25/30*   (2006.01)

(52) U.S. Cl.
CPC .......... *B23P 19/042* (2013.01); *F01D 25/162* (2013.01); *F01D 25/30* (2013.01); *F05D 2220/323* (2013.01); *F05D 2230/70* (2013.01); *F05D 2240/50* (2013.01)

(58) Field of Classification Search
CPC ...... B23P 19/042; F01D 25/162; F01D 25/30; F01D 25/285; F01D 5/005; F01D 25/16; F05D 2220/323; F05D 2230/70; F05D 2240/50; F05D 2250/232; F05D 2230/72; F05D 2230/80; F02C 7/06
See application file for complete search history.

(56) References Cited

U.S. PATENT DOCUMENTS

| | | | |
|---|---|---|---|
| 9,638,106 B2 | 5/2017 | Muller | |
| 9,694,482 B2 | 7/2017 | Thomas | |
| 10,132,198 B2 * | 11/2018 | Baba | ........................ F01D 25/28 |
| 2013/0074334 A1 | 3/2013 | Swiderski et al. | |
| 2016/0052756 A1 | 2/2016 | Yamasue et al. | |

FOREIGN PATENT DOCUMENTS

JP    2011021541    2/2011

OTHER PUBLICATIONS

European Patent Office, European Search Report dated Nov. 19, 2019 in Application No. 19187551.7.

* cited by examiner

*Primary Examiner* — Rick K Chang
(74) *Attorney, Agent, or Firm* — Snell & Wilmer L.L.P.

(57) ABSTRACT

The present disclosure provides a method of removing a bearing compartment from a gas turbine engine comprising inserting a tool between an aft portion of a low pressure turbine and a forward portion of a turbine exhaust case, the tool comprising one of a single wedge-shaped ring or a plurality of wedge-shaped segments, removing a plurality of fasteners coupling a flange of a bearing compartment housing to the turbine exhaust case, the bearing compartment housing containing the bearing compartment, and removing the bearing compartment housing from an aft portion of the gas turbine engine.

16 Claims, 6 Drawing Sheets

METHOD OF REMOVING BEARING COMPARTMENT

FIELD OF THE DISCLOSURE

The present disclosure relates to methods of removal of bearing compartments, and more particularly, to removal of bearing compartments from gas turbine engines.

BACKGROUND OF THE DISCLOSURE

Gas turbine engines typically utilize multiple shafts which transmit torque between the turbine and compressor sections of the gas turbine engine. The shafts are typically supported by multiple bearings housed within bearing compartments. Present maintenance and replacement procedures of some of these bearing compartments requires removal of other structures of the gas turbine engine to remove the bearing compartments, thereby increasing maintenance and replacement time.

SUMMARY OF THE DISCLOSURE

A method of removing a bearing compartment from a gas turbine engine, may comprise inserting a tool between an aft portion of a low pressure turbine and a forward portion of a turbine exhaust case, the tool comprising one of a single wedge-shaped ring or a plurality of wedge-shaped segments, removing a plurality of fasteners coupling a flange of a bearing compartment housing to the turbine exhaust case, the bearing compartment housing containing the bearing compartment, removing the bearing compartment housing from an aft portion of the gas turbine engine.

In various embodiments, the tool may be configured to redistribute weight of the low pressure turbine from the bearing compartment housing to the tool. The method may further comprise decoupling the bearing compartment housing from a low pressure turbine shaft. The tool may contact at least a portion of a radially inward surface of the low pressure turbine and at least a portion of a radially outward surface of the turbine exhaust case. The tool may be localized between an upper portion of the low pressure turbine and an upper portion of the turbine exhaust case. The tool may comprise a base, an inner ring, an outer ring, and a vertex. The flange may extend circumferentially around a radially outer surface of the bearing compartment housing and separate the bearing compartment housing into a first bearing compartment and a second bearing compartment. The low pressure turbine and the turbine exhaust case may be coupled to the gas turbine engine. Removing the bearing compartment housing from the gas turbine engine may comprise removing the bearing compartment housing from the gas turbine engine along a central longitudinal axis of the gas turbine engine. Removing the bearing compartment housing from the aft portion of the gas turbine engine may comprise coupling an aft portion of the bearing compartment housing to a fixture and moving the fixture. The method may further comprise inserting a second bearing compartment housing into the gas turbine engine, the second bearing compartment housing containing a second bearing compartment, coupling the second bearing compartment housing to the turbine exhaust case using the plurality of fasteners, and removing the tool between the low pressure turbine and the turbine exhaust case.

A combination of a gas turbine engine and a tool may comprise a low pressure turbine, a turbine exhaust case coupled to an aft portion of the low pressure turbine, and a bearing compartment housing coupled to a shaft positioned radially inward of the low pressure turbine and the turbine exhaust case, wherein a tool is configured to be positioned between the low pressure turbine and the turbine exhaust case in order to remove the bearing compartment housing from the gas turbine engine.

In various embodiments, the tool comprises one of a single wedge-shaped ring or a plurality of wedge-shaped segments. The tool may be configured to redistribute weight of the low pressure turbine from the bearing compartment housing to the tool. The tool may contact at least a portion of a radially inward surface of the low pressure turbine and at least a portion of a radially outward surface of the turbine exhaust case.

A method of disassembling a gas turbine engine may comprise removing from the gas turbine engine a bearing compartment housing that supports a low pressure turbine shaft when the gas turbine engine is in an assembled state without removing the low pressure turbine shaft. The tool may comprise one of a single wedge-shaped ring or a plurality of wedge-shaped segments.

In various embodiments, the tool may be configured to redistribute weight of the low pressure turbine from the bearing compartment housing to the tool. Removing the bearing compartment housing may comprise removing the bearing compartment housing from an aft portion of the gas turbine engine.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, electrical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, methods, systems, and articles may find particular use in connection with maintenance of gas turbine engines. However, various aspects of the disclosed embodiments may be adapted for performance in a variety of other systems. As such, numerous applications of the present disclosure may be realized.

Figure 1:
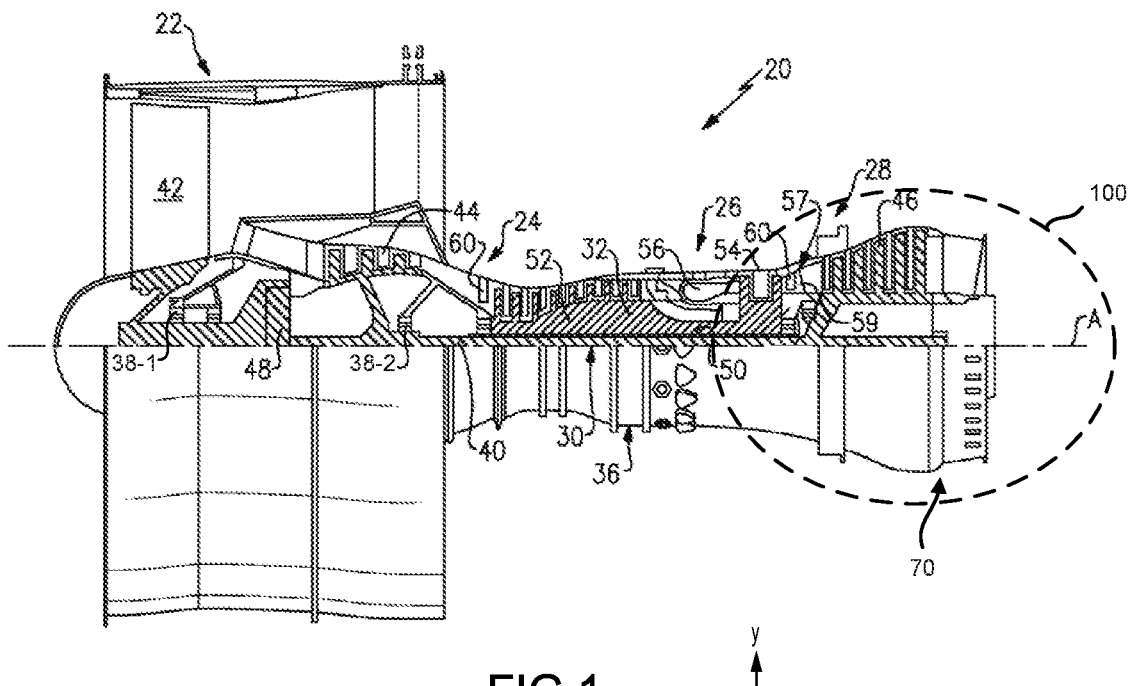
FIG. 1 illustrates a schematic view of a gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. In operation, fan section 22 can drive air along a bypass flow-path while compressor section 24 can drive air for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Figure 5:
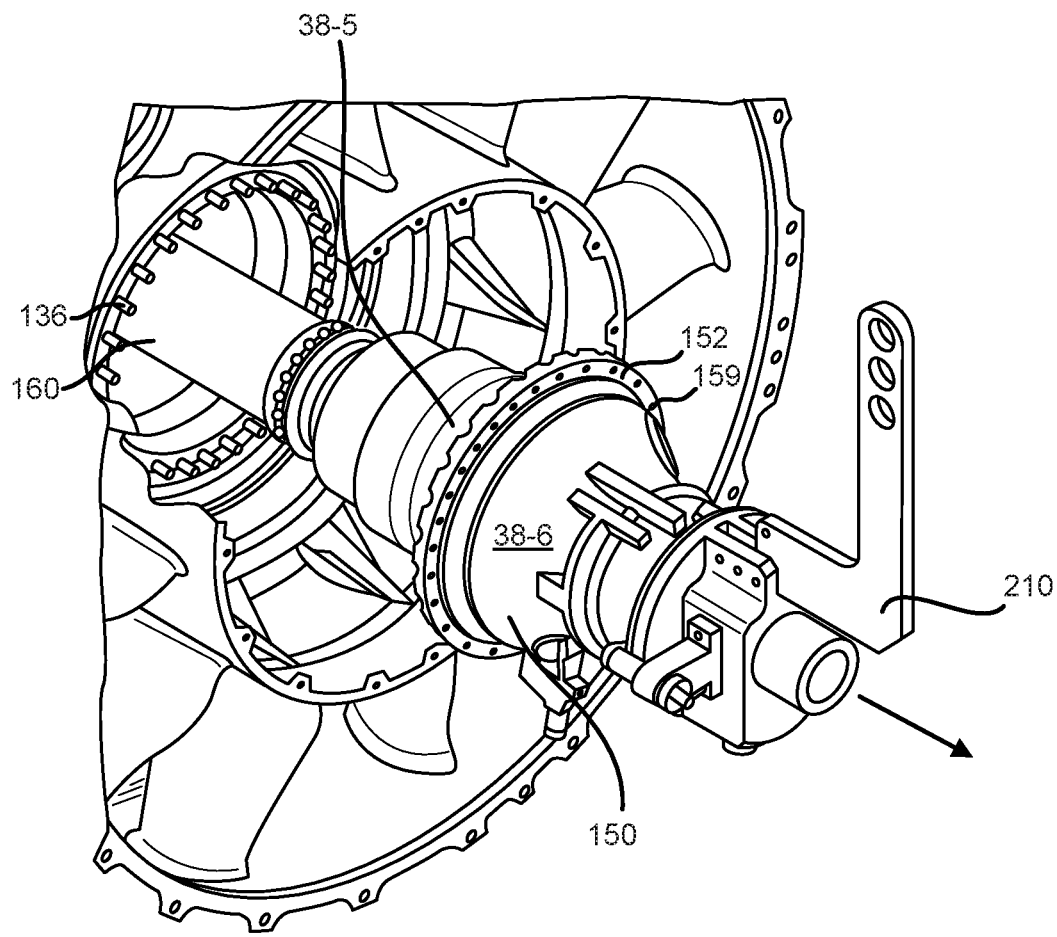
FIG. 5 illustrates a method of removing bearing compartments from a gas turbine engine from a rear perspective, in accordance with various embodiments.

Gas turbine engine 20 may generally comprise a low speed spool 30 and a high speed spool 32 mounted for rotation about an engine central longitudinal axis A relative to an engine static structure 36 via one or more bearing compartments 38 (shown as bearing compartment 38-1 and bearing compartment 38-2 in FIG. 1 or bearing compartment 38-5 and bearing compartment 38-6 in FIG. 5). It should be understood that various bearing compartments 38 at various locations may alternatively or additionally be provided, including for example, bearing compartment 38, bearing compartment 38-1, bearing compartment 38-2, bearing compartment 38-3, bearing compartment 38-4, bearing compartment 38-5, and bearing compartment 38-6. Bearing compartments 38-5 and 38-6 may be located at an aft portion of gas turbine engine 20.

Low speed spool 30 may generally comprise an inner shaft 40 that interconnects a fan 42, a low pressure (or first) compressor section 44 (also referred to a low pressure compressor) and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor ("HPC") 52 (e.g., a second compressor section) and high pressure (or second) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing compartments 38 in turbine section 28. Inner shaft 40 and outer shaft 50 may be concentric and rotate via bearing compartments 38 about the engine central longitudinal axis A, which is collinear with their longitudinal axes. As used herein, a "high pressure" compressor or turbine experiences a higher pressure than a corresponding "low pressure" compressor or turbine.

Core airflow may be compressed by low pressure compressor 44 then HPC 52, mixed and burned with fuel in combustor 56, then expanded over high pressure turbine 54 and low pressure turbine 46. Mid-turbine frame 57 includes airfoils 59 which are in the core airflow path. Low pressure turbine 46 and high pressure turbine 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about (5:1). Low pressure turbine 46 pressure ratio may be measured prior to inlet of low pressure turbine 46 as related to the pressure at the outlet of low pressure turbine 46 prior to an exhaust nozzle radially inward of a turbine exhaust case 70. It should be understood, however, that the above parameters are exemplary of various embodiments of a suitable geared architecture engine and that the present disclosure contemplates other gas turbine engines including direct drive turbofans.

In various embodiments, fan 42, low pressure compressor 44, high pressure 52 compressor, low pressure turbine 46, and high pressure turbine 54 may comprise one or more stages or sets of rotating blades and one or more sets of stationary blade vanes axially interspersed with the associated blade stages but non-rotating about engine central longitudinal axis A.

Figure 2:
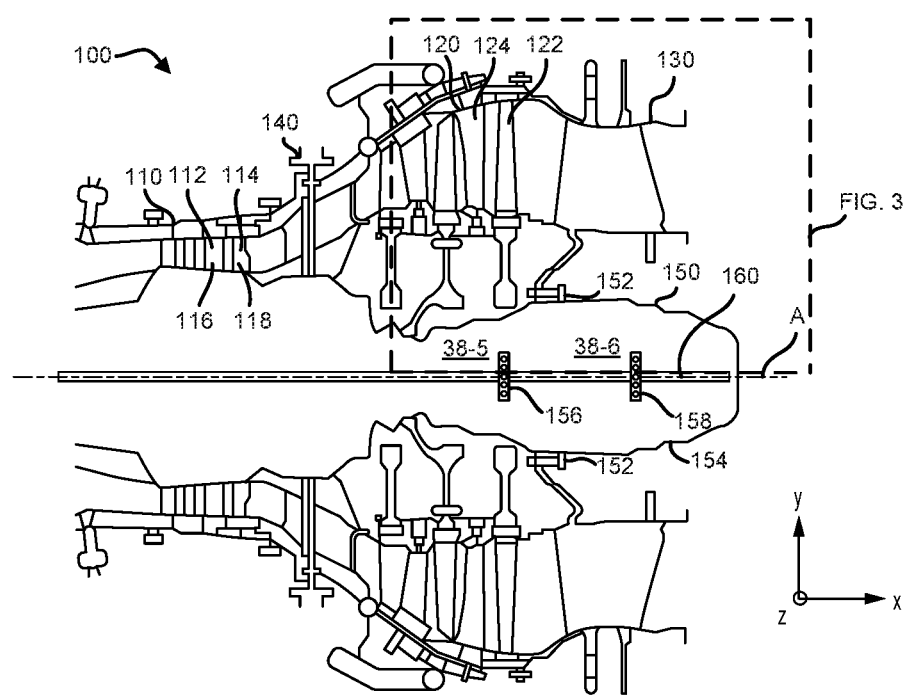
FIG. 2 illustrates a cross-sectional view of an aft portion of a gas turbine engine, in accordance with various embodiments.

With reference to FIG. 2, a cross-sectional view of an aft portion 100 of a gas turbine engine is illustrated, in accordance with various embodiments. Aft portion 100 may form a portion of a gas turbine engine similar to gas turbine engine 20. Aft portion 100 may comprise high pressure turbine 110 and low pressure turbine axially 120 aft of high pressure turbine 102. As referred to herein, axially may refer to a direction along the x-axis, aft may refer to a direction in the positive x-direction and forward may refer to a direction in the negative x-direction. Up or upper may refer to a direction in the positive y-direction, while down or downward may refer to a direction in the negative y-direction. High pressure turbine 110 may include alternating rows of rotor assemblies 112 and vane assemblies 114 that carry airfoils that extend into the core flow path. For example, the rotor assemblies 112 may carry a plurality of rotating blades 116, while each vane assembly 114 may carry a plurality of vanes 118 that extend into the core flow path. Vanes 118 may be arranged circumferentially about engine central longitudinal axis A. Blades 116 may rotate about engine central longitudinal axis A, while vanes 118 may remain stationary about engine central longitudinal axis A. Blades 116 create or extract energy (in the form of pressure) from the core airflow that is communicated through aft portion 100. Similarly, low pressure turbine 120 may include alternating rows of rotor assemblies 122 and vane assemblies 124 that carry airfoils that extend into the core flow path. A turbine exhaust case 130 may be positioned axially aft of and coupled to low pressure turbine 120. High pressure turbine 110 and low pressure turbine 120 may be separated by mid-turbine frame 140 designed to support or more bearing compartments radially inward of mid-turbine frame 140.

Still referring to FIG. 2, aft portion 100 may comprise bearing compartment housing 150 radially inward of low pressure turbine 120 and turbine exhaust case 130. Bearing compartment housing 150 may be coupled to turbine exhaust case 130 by a flange 152 extending circumferentially around a radially outer surface 154 of bearing compartment housing 150. Bearing compartment housing 150 may house a bearing compartment 38-5 comprising a first bearing 156 and a bearing compartment 38-6 comprising a second bearing 158. Together, first bearing 156 and second bearing 158 may support low pressure turbine shaft 160 and allow low pressure turbine shaft 160 to rotate about central longitudinal axis A and drive low pressure turbine rotor assemblies. First bearing 156 and second bearing 158 may comprise roller bearings, however, are not limited in this regard and may comprise other suitable bearings such as ball bearings, thrust ball bearings, tapered roller bearings, magnetic bearings, or other suitable types of bearings.

Figure 3:
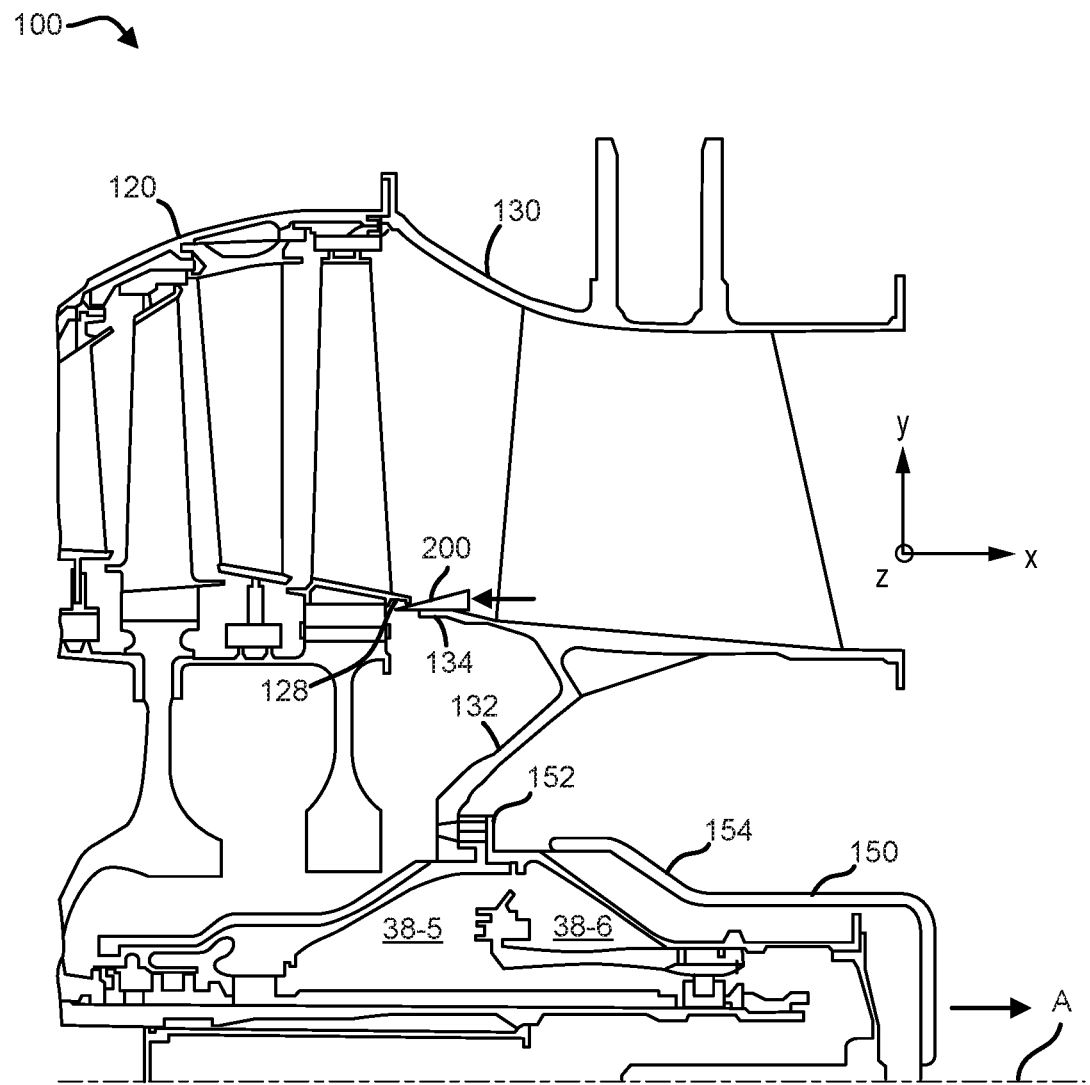
FIG. 3 illustrates a cross-sectional view of tool being inserted between a low pressure turbine and a turbine exhaust case of a gas turbine engine, in accordance with various embodiments.

Referring now to FIG. 3, a detailed view of aft portion 100 is illustrated, in accordance with various embodiments. FIG. 3 illustrates a method of removing bearing compartment 38-5 and 38-6 without the need to remove low pressure turbine 120 or turbine exhaust case 130. Prior to removal of bearing compartment 38-5 and 38-6, flange 152 of a bearing compartment housing 150 may be coupled to a support 132 positioned at radially inner portion of turbine exhaust case 130. Flange 152 may be positioned circumferentially around a radially outer surface 154 of bearing compartment housing 150 and be located axially between bearing compartment 38-5 and bearing compartment 38-6. While installed, bearing compartment housing 150 may support low pressure turbine 120 from shifting downward (in the negative y-direction) toward central longitudinal axis A. In accordance with various embodiments, a tool 200 may be inserted between axially aft portion 128 of low pressure turbine 120 and axially forward portion 134 of turbine exhaust case 130. Tool 200 may be inserted between low pressure turbine 120 and turbine exhaust case 130 in an axially forward direction as indicated by the arrow in FIG. 3. Tool 200 may be in the form of a plurality of discontinuous wedge-shaped segments, a singular, wedge-shaped ring configured to be positioned between aft portion of low pressure turbine 120 and forward portion of turbine exhaust case 130 along an entire circumferential length there between, or any other shape or form suitable for preventing downward shift of low pressure turbine 120 upon removal of bearing compartment housing 150. Tool 200 may supply a normal force to a radially inward surface of low pressure turbine 120 in response to gravitational forces forcing low pressure turbine 120 downward. Tool 200 may stabilize low pressure turbine 120. As such, in various embodiments, tool 200 may be localized only between an upper portion of low pressure turbine 120 and turbine exhaust case 130, however, tool 200 is not limited in this regard and may be positioned elsewhere in addition to or instead of upper portion of low pressure turbine 120 and turbine exhaust case 130. Once tool 200 is inserted, bearing compartments 38-5 and 38-6 may be removed without removal of low pressure turbine 120 or turbine exhaust case 130.

Figure 4A:
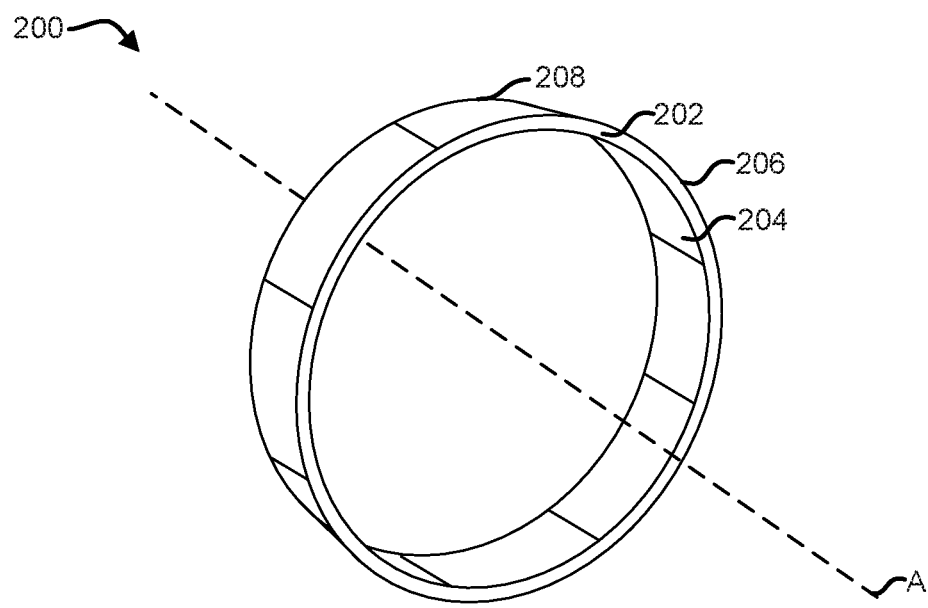
FIGS. 4A and 4B illustrate tools for removing bearing compartments from a gas turbine engine, in accordance with various embodiments.
Figure 4B:
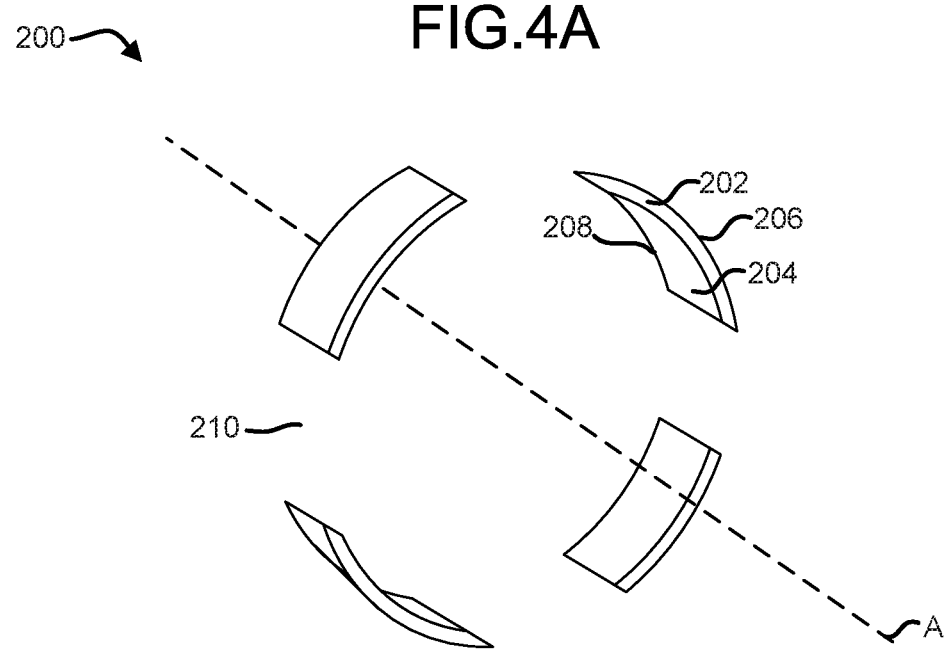

Referring now to FIGS. 4A and 4B, tool 200 is depicted from an aft perspective view, in accordance with various embodiments. Tool 200 may comprise a base 202 positioned radially between an inner ring 204 and an outer ring 206 positioned radially outward of inner ring 204. Inner ring 204 and outer ring 206 may extend forward and mate at a vertex 208 positioned forward of base 202. In various embodiments, inner ring 204 and outer ring 206 may angled radially inwardly such that inner ring 204 and outer ring 206 progressively converge toward longitudinal axis A from base 202 towards vertex 208. In various other embodiments, inner ring 204 and outer ring may be angled radially outward such that inner ring 204 and outer ring 206 progressively diverge from longitudinal axis A from base 202 towards vertex 208. In various embodiments, vertex 208 may be positioned radially equidistant from both inner ring 204 and outer ring 206. As previously stated, tool 200 may comprise a single component (FIG. 4A) or a plurality of tool segments circumferentially separated by gaps 210 (FIG. 4B).

With reference now to FIG. 5, a method of removing bearing compartments 38-5 and 38-6 from a gas turbine engine from a rear perspective is illustrated, in accordance with various embodiments. Prior to removal from the gas turbine engine, bearing compartment 38-5 and 38-6 may be coupled to turbine exhaust case 130 by a plurality of fasteners coupling bearing compartment housing 150 to turbine exhaust case 130. The plurality of fasteners may extend through a plurality of apertures 159 positioned circumferentially around flange 152. A plurality of posts 136 extending axially aftward from turbine exhaust case 130 may mate with the plurality of apertures 159 on flange 152. Accordingly, bearing compartment housing 150 may be coupled to turbine exhaust case 130 by a plurality of bolts and nuts or other suitable coupling method. Tool 200 (with momentary reference to FIGS. 4A and 4B) may be positioned between low pressure turbine 120 and turbine exhaust case 130, the plurality of fasteners may be removed, and bearing compartment housing 150 may be removed through an aft portion of the gas turbine engine. Low pressure turbine shaft 160 may remain in the gas turbine engine while bearing compartment housing 150 is removed. Accordingly, bearing compartment housing may be decoupled from low pressure turbine shaft 160 as well. In various embodiments, aft portion of bearing compartment housing 150 may be coupled to fixture 210 to remove bearing compartment housing 150 and low pressure turbine shaft 160. As such, bearing compartment 38-5 and bearing compartment 38-6 may be removed from the gas turbine engine without the need to remove other components such as the low pressure turbine 120 or turbine exhaust case 130. Therefore, assembly/disassembly time associated with maintenance or replacement of bearing compartments 38-5 and 38-6 may be reduced and maintenance can be specifically targeted to the bearing compartments without regard to the surrounding components.

Figure 6:
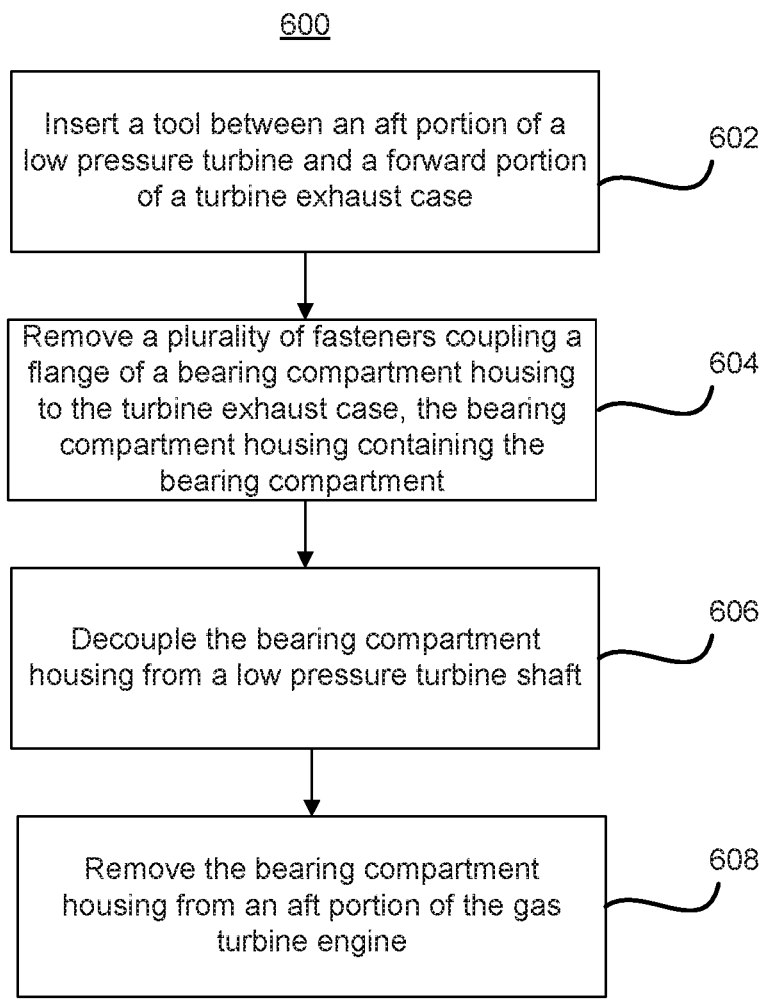
FIG. 6 illustrates a block diagram illustrating a method of removing bearing compartments from a gas turbine engine, in accordance with various embodiments.

A block diagram illustrating a method 600 for removing a bearing compartment from a gas turbine engine is illustrated in FIG. 6, in accordance with various embodiments.

The method may comprise inserting a tool between an aft portion of a low pressure turbine and a forward portion of a turbine exhaust case (step 602). The method may further comprise removing a plurality of fasteners coupling a flange of a bearing compartment housing to the turbine exhaust case (step 604). The method may further comprise decoupling the bearing compartment housing from a low pressure turbine shaft (step 606). The method may further comprise removing the bearing compartment from an aft portion of the gas turbine engine (step 608).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Methods, systems, and computer-readable media are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of removing a bearing compartment from a gas turbine engine, comprising:
   inserting a tool between an aft portion of a low pressure turbine and a forward portion of a turbine exhaust case;
   removing a plurality of fasteners coupling a flange of a bearing compartment housing to the turbine exhaust case, the bearing compartment housing containing the bearing compartment; and
   removing the bearing compartment housing from an aft portion of the gas turbine engine, wherein the turbine exhaust case and the low pressure turbine remain attached to the gas turbine engine while removing the bearing compartment housing.

2. The method of claim 1, wherein the tool comprises one of a single wedge shaped ring or a plurality of wedge shaped rings and is configured to redistribute weight of the low pressure turbine from the bearing compartment housing to the tool.

3. The method of claim 1, further comprising decoupling the bearing compartment housing from a low pressure turbine shaft.

4. The method of claim 1, wherein the tool contacts at least a portion of a radially inward surface of the low pressure turbine and at least a portion of a radially outward surface of the turbine exhaust case.

5. The method of claim 1, wherein the tool is localized between an upper portion of the low pressure turbine and an upper portion of the turbine exhaust case.

6. The method of claim 1, wherein the tool comprises a base, an inner ring, an outer ring, and a vertex.

7. The method of claim 1, wherein the flange extends circumferentially around a radially outer surface of the bearing compartment housing and separates the bearing compartment housing into the bearing compartment and a second bearing compartment.

8. The method of claim 1, wherein the low pressure turbine and the turbine exhaust case are coupled to the gas turbine engine.

9. The method of claim 1, wherein removing the bearing compartment housing from the gas turbine engine comprises removing the bearing compartment housing from the gas turbine engine along a central longitudinal axis of the gas turbine engine.

10. The method of claim 1, wherein removing the bearing compartment housing from the aft portion of the gas turbine engine comprises coupling an aft portion of the bearing compartment housing to a fixture and moving the fixture.

11. The method of claim 1, further comprising:
    inserting a second bearing compartment housing into the gas turbine engine, the second bearing compartment housing containing a second bearing compartment;
    coupling the second bearing compartment housing to the turbine exhaust case using the plurality of fasteners; and
    removing the tool between the low pressure turbine and the turbine exhaust case.

12. A method of disassembling a gas turbine engine, comprising:
    removing from the gas turbine engine a bearing compartment housing that supports a low pressure turbine shaft when the gas turbine engine is in an assembled state without removing the low pressure turbine shaft, wherein a turbine exhaust case and a low pressure turbine coupled to the low pressure turbine shaft remain attached to the gas turbine engine while removing the bearing compartment housing.

13. The method of claim 12, further comprising:
prior to removing the bearing compartment housing, inserting a tool between an aft portion of the low pressure turbine of the gas turbine engine and a forward portion of the turbine exhaust case of the gas turbine engine.

14. The method of claim 13, wherein the tool is configured to redistribute weight of the low pressure turbine from the bearing compartment housing to the tool.

15. The method of claim 14, wherein the tool comprises one of a single wedge-shaped ring or a plurality of wedge-shaped segments.

16. The method of claim 13, wherein removing the bearing compartment housing comprises removing the bearing compartment housing from an aft portion of the gas turbine engine.

* * * * *